United States Patent [19]

Mauws

[11] 3,792,743

[45] Feb. 19, 1974

[54] SUSPENSION SYSTEM FOR ENDLESS TRACK VEHICLE

[75] Inventor: Lawrence J. Mauws, Portage La Prairie, Manitoba, Canada

[73] Assignee: Roll-O-Flex 1970 Ltd., Regina, Saskatchewan, Canada

[22] Filed: June 2, 1972

[21] Appl. No.: 259,122

[30] Foreign Application Priority Data
June 21, 1971 Canada................................ 116172

[52] U.S. Cl..................................... 180/5 R, 305/27
[51] Int. Cl............................................. B62m 27/02
[58] Field of Search ...... 180/5 R, 9.5, 9.54; 305/27, 305/24

[56] References Cited
UNITED STATES PATENTS

| 3,404,745 | 10/1968 | Smieja | 180/5 R |
|---|---|---|---|
| 3,613,810 | 10/1971 | Hetteen | 180/5 R |
| 3,485,312 | 12/1969 | Swenson | 180/5 R |
| 3,705,637 | 12/1972 | Harvey | 180/5 R |
| 3,705,749 | 12/1972 | Harvey | 180/5 R |
| 3,637,035 | 1/1972 | Washburn | 180/5 R |

Primary Examiner—Richard J. Johnson
Attorney, Agent, or Firm—Emory L. Groff; Emory L. Groff, Jr.

[57] ABSTRACT

A snowmobile suspension system includes a knee-action linkage near the rear end of the vehicle between the axle of the idler wheels in the endless track and the vehicle frame permitting relatively large, resilient vertical displacement of the rear end of the vehicle relative to the endless track or belt. Torsion springs mounted co-axially on a sleeve secured to the idler wheel axle bias the rear end of the vehicle upwardly or downwardly depending on the direction of vertical displacement of the rear end of the endless track.

6 Claims, 6 Drawing Figures

SUSPENSION SYSTEM FOR ENDLESS TRACK VEHICLE

BACKGROUND OF THE INVENTION

This invention relates to a suspension system for an endless track vehicle, and in particular to a suspension system for a snowmobile.

It is well known that snowmobiles include a light frame capable of supporting a driver and a passenger, a front steering mechanism, an endless track suspended beneath the vehicle frame in the so-called well of the frame and a drive in the form of an internal combustion engine for driving the endless track. The endless track is driven by drive wheels connected to the engine by a driven shaft, the drive wheels being equipped with sprockets for engaging openings provided in rows along each side of the inner surface of the track. The drive wheels are located at the front end of the endless track, and idler wheels are provided at the rear end of the track. In order to maintain a reasonable tension on the track, i.e., to keep the track in contact with the ground, rollers are provided between the drive and idler wheels, and such rollers are normally provided with some form of suspension for maintaining the track under tension and absorbing shock during travel over rough terrain.

One form of suspension for snowmobiles (see Canadian Pat. No. 714,454, which issued to G. Marier on July 27, 1965) includes horizontal shafts beneath the frame of a snowmobile and extending between the sides thereof, each shaft resiliently supporting rollers or wheels for tensioning the endless belt or track.

Another form of suspension used in snowmobiles is disclosed in Canadian Patent No. 864,998, which issued to A. R. Erickson on March 2, 1961. The Erickson suspension system includes a plurality of bogie wheels engaging the bottom of the endless track. The bogie wheels are resiliently connected to shafts extending between the sides of the vehicle frame by a relatively complicated spring assembly permitting vertical movement of the wheels.

It has been found that existing suspension systems for snowmobiles permit a relatively limited vertical movement of the track supporting rollers and of the rear end of the endless track. Consequently, when passing over a bump the rear end of the vehicle rises somewhat rapidly which tends to throw the driver and/or passenger from the vehicle. Moreover, with existing suspension systems, snowmobiles provide a relatively rough ride, because of the short vertical distance through which the track supporting wheels or rollers can move when rotating about the commonly used horizontally extending shafts on which the support wheels or bogie systems are mounted.

BRIEF DESCRIPTION OF THE INVENTION

The object of the present invention is to alleviate the above shortcomings of existing suspension systems by providing a suspension system, which permits a controlled, relatively large vertical displacement of the rear end of an endless track vehicle relative to the suspension.

Another object of the invention is to provide a suspension system for the front end of an endless track vehicle which permits controlled vertical displacement of the front end of the vehicle by substantially the same amount as the rear end thereof.

Accordingly, the present invention relates to a suspension system for an endless track vehicle including a bogie frame disposed within the endless track or belt on which a plurality of track supporting rollers are fixedly mounted, and linkage means resiliently connecting the rear end of the frame to the vehicle frame. Normally, the front end of the bogie frame is also resiliently connected to the vehicle frame.

BRIEF DESCRIPTION OF THE DRAWINGS

The invention will now be defined in greater detail with reference to the accompanying drawings illustrating a preferred embodiment of the invention, and wherein.

DESCRIPTION OF PREFERRED EMBODIMENTS

Figure 1:
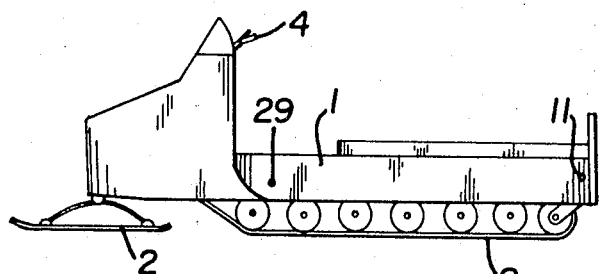
FIG. 1 is a schematic side view of a snowmobile including the suspension system of the present invention.
Figure 2:
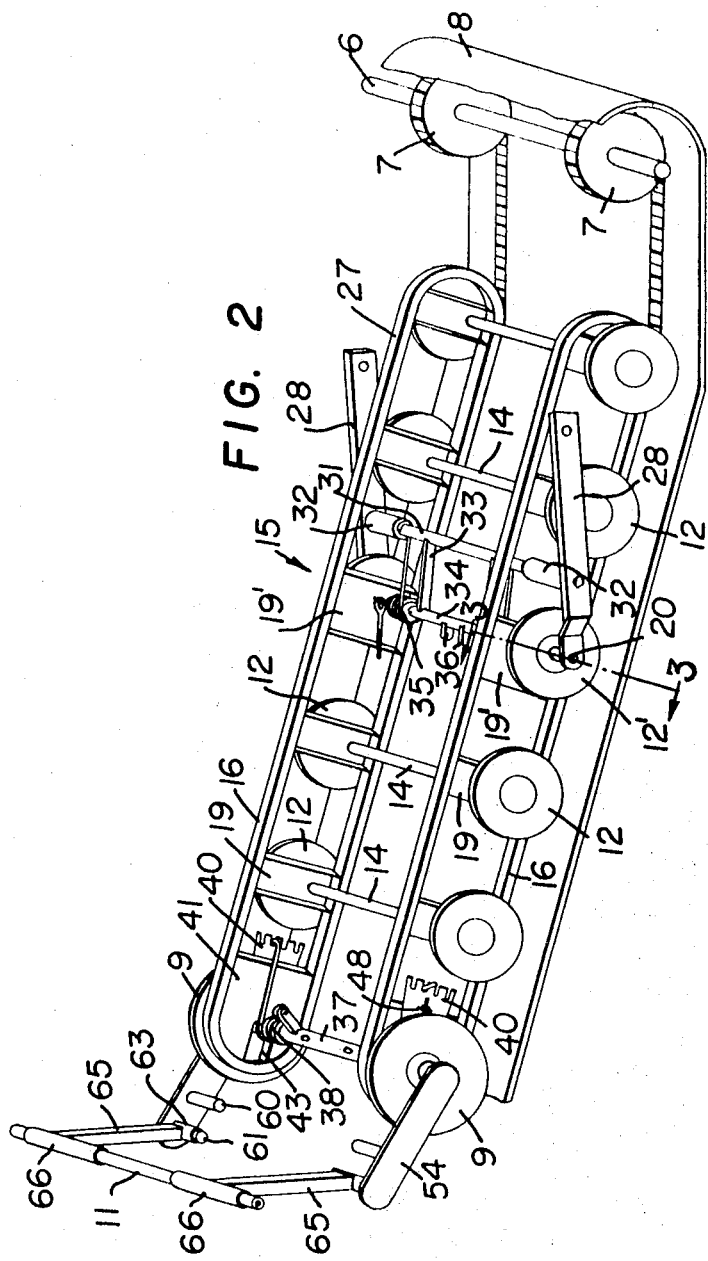
FIG. 2, which is found on the second sheet of drawings, is a perspective view of the suspension system of the present invention.

With reference to the drawings and in particular FIGS. 1 and 2, the suspension system of the present invention is mounted in any conventional snowmobile frame 1, which is equipped with front end skis 2, connected to a steering lever 4, and an engine which is connected to a front driven shaft 6 (FIG. 2) carrying toothed drive wheels 7 for driving an endless track 8. The rear end of the endless track 8 extends around idler wheels 9, which are rotatably mounted on an axle 10 (FIG. 5) within the endless track at the rear end of the vehicle. The axle 10 is resiliently connected to a shaft 11 extending between the sides of the vehicle frame 1 in a manner described in greater detail hereinafter.

In order to maintain the endless track 8 under tension and to prevent deformation of the track, track supporting rollers 12 are provided between the drive and idler wheels 7 and 9, respectively. The rollers 12 are rotatably mounted on the outer ends of horizontal axles 14, which are fixedly mounted in a bogie frame, generally indicated at 15. The bogie frame 15 includes a pair of elongated side frame members 16, which, as shown in FIG. 2, are mounted within the endless track 8 and suspended from the vehicle frame 1.

Figure 3:
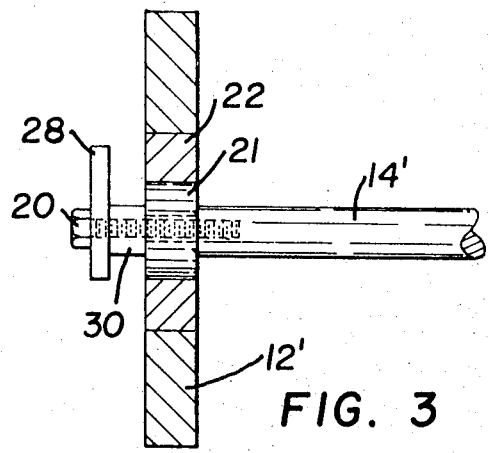
FIG. 3 is a cross-sectional view taken generally along line 3—3 of FIG. 2.

The frame members 16 are formed of steel tubing having a rectangular cross-sectional configuration. However, the frame members 16 can be formed as solid one-piece elements, but for keeping the weight of the system to a minimum it is preferable to use tubes. The axles 14 rotatably supporting the rollers 12 extend between the frame members 16, the ends of the axles 14 extending through fixed vertical plates 19. The plates 19 form part of the frame members 16 and extend between the top and bottom of such frame members. The rollers 12 are securely mounted on the ends of the axles 14 by bolts 20 (FIG. 3), which extend through bearings 21 in hubs 22 of the rollers into the ends of the axles 14.

Figure 4:
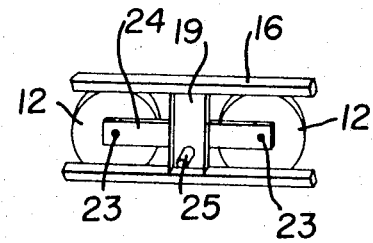
FIG. 4 is a perspective view of bogie wheels for use in the apparatus of FIG. 2.

The rollers 12 may be mounted in true bogie fashion. As shown in FIG. 4, in this embodiment of the invention, a pair of rollers 12 are mounted on stub axles 23, which have inner ends securely mounted in a longitudinally extending bogie arm 24. The bogie arm is rotatably mounted on an axle 25 extending through a vertical plate 19, whereby the arm 24 and rollers 12 are rotatable about the horizontal, longitudinal axis of the axle 25.

The front end 27 of the bogie frame 15 is suspended from the vehicle frame 1 by means of connecting arms 28 near such front end. A bolt or stub axle 29 (FIG. 1) pivotally connects the upper end of each arm 28 to the sides of the vehicle frame 1. The lower end of each arm 28 is connected to the axle 14' by a bolt 20 which extends through the arm 28, a spacer sleeve 30 and the bearing 21 of the roller 12' into the axle 14'.

The arms 28 are interconnected by a shaft with a sleeve 31 rotatably mounted thereon. The shaft and sleeve 31 extends between the arms 28 at a position close to the lower end of the arms. Rubber protection sleeves 32 are mounted on the outer ends of the sleeve 31 for protecting the shaft and sleeve 31 during use. The sleeve 31 is connected by a pair of arms 33 to a sleeve 34 rotatably mounted on axle 14'. A torsion spring 35 is provided on a bushing on each end of the axle 14' between the frame members 16 for resiliently biasing the front end of the frame 15 downwardly, i.e., the spring 35 performs in the same manner as a conventional snowmobile spring suspension. One end of the spring 35 is connected to a plate 19', and the other end of the spring 35 is looped around the sleeve 31.

The sleeve 34 is optionally provided with a bracket in the form of a pair of arms 36 for connecting the sleeve 34 to a conventional shock absorber (not shown). If used, the shock absorber is pivotally mounted on the axle 14 adjacent to the axle 14' in a rearward direction, the outer end of the piston rod of the shock absorber being pivotally mounted in the bracket defined by the arms 36.

Figure 5:
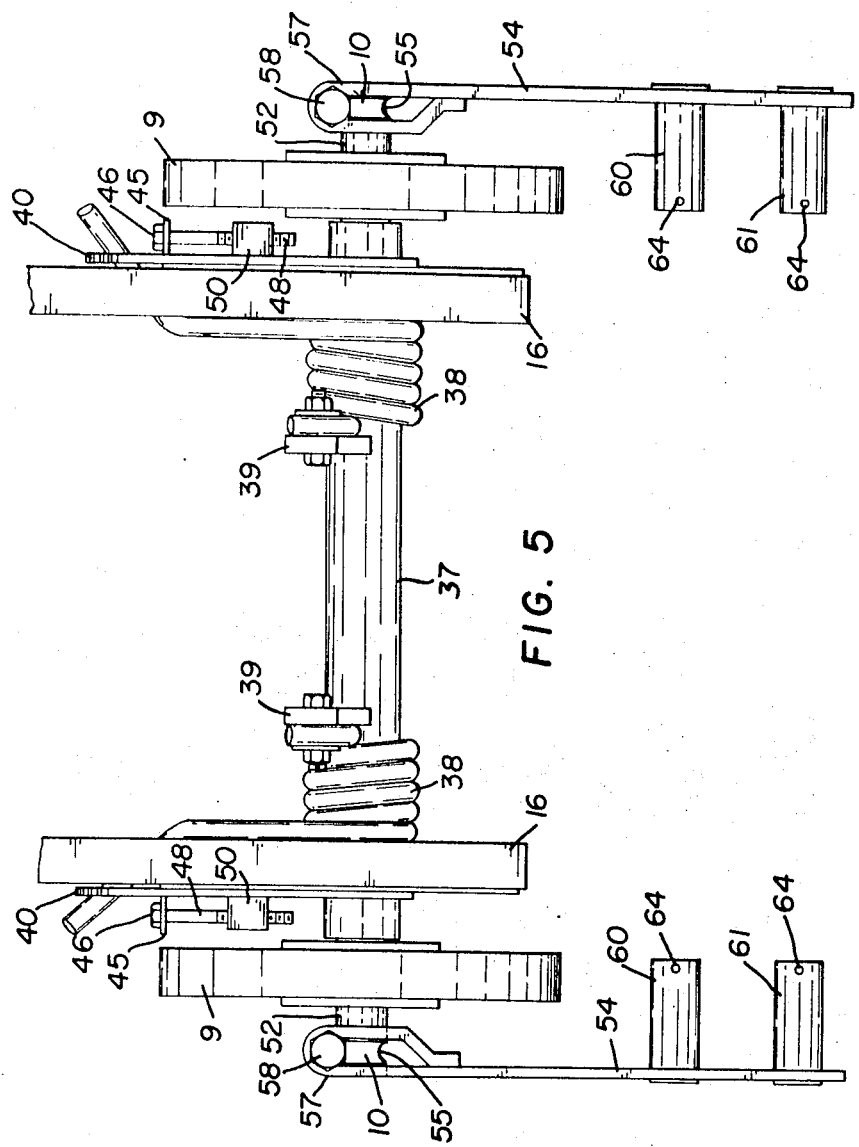
FIG. 5 is a plan view of the rear end of the suspension system of FIG. 2.

With reference to FIG. 5, the rear end of the bogie frame 15 is connected to the vehicle frame 1 by the suspension system of the present invention which includes a sleeve 37 securely mounted on the axle 10 supporting the idler wheels 9. Helical torsion springs 38 are provided on each end of the sleeve 37 between the idler wheels 9. One end of each spring 38 is connected to a lug 39 on the sleeve 37, and the other end of each spring extends into a notched plate 40, which permits adjustment of the spring tension on the sleeve 37. The plate 40 is located outside an end plate 41 in each side member 16 of the frame 15. The end plate 41 has a shape, which conforms to the curved inner surface of the rear end of the frame member 16. The end plate 41 includes an elongated opening 43 through which the sleeve 37 and shaft 11 extend to the idler wheels 9. The opening 43 permits forward and rearward movement of the shaft 11 and sleeve 37, whereby the tension on the endless belt 8 can be varied. The plate 40 is secured to the sleeve 35 outside of an idler wheel 9, and is provided with a flange 45 supporting the head 46 of a bolt 48. The bolt 48 extends through a threaded lug 50 which is mounted on the end plate 41 and extends outwardly therefrom. By turning the bolts 48 on each side of the frame 15, the plate 40, sleeve 37, shaft 11 and consequently the idler rollers 9 are moved longitudinally of the frame 15 to alter the tension on the endless belt 8.

A sleeve 52 is provided on each end of the axle 10 for spacing the axle from a horizontal arm 54, which forms part of a linkage element between the rear end of the bogie frame 15 and the shaft 11. Each horizontal arm 54 is securely connected to the outer end of the axle 10, which is provided with an annular groove 55 for this purpose. The front end of each arm 54 is folded over on itself to form a bracket 57 having an aperture in its inner side for receiving the end of the axle 10. A bolt 58 extends through the bracket 57 adjacent its outer end tangentially of the groove 55 to firmly secure one end of each horizontal arm 54 to the end of the axle 10 for rotation about the horizontal axis of the axle 10. The outer end of each arm 54 is provided with a pair of inwardly extending stub axles 60 and 61, on one of which a sleeve 63 (FIG. 2) forming the bottom end of a vertical linkage arm 65 is pivotally mounted. The sleeve 63 is held on the axle 60 or 61 by a cotter pin (not shown) which passes through a hole 64 near the inner free end of the axle. The upper end of the vertical arm 65 is also in the form of a sleeve 66 for pivotally connecting the arm 54 to the shaft 11.

Figure 6:
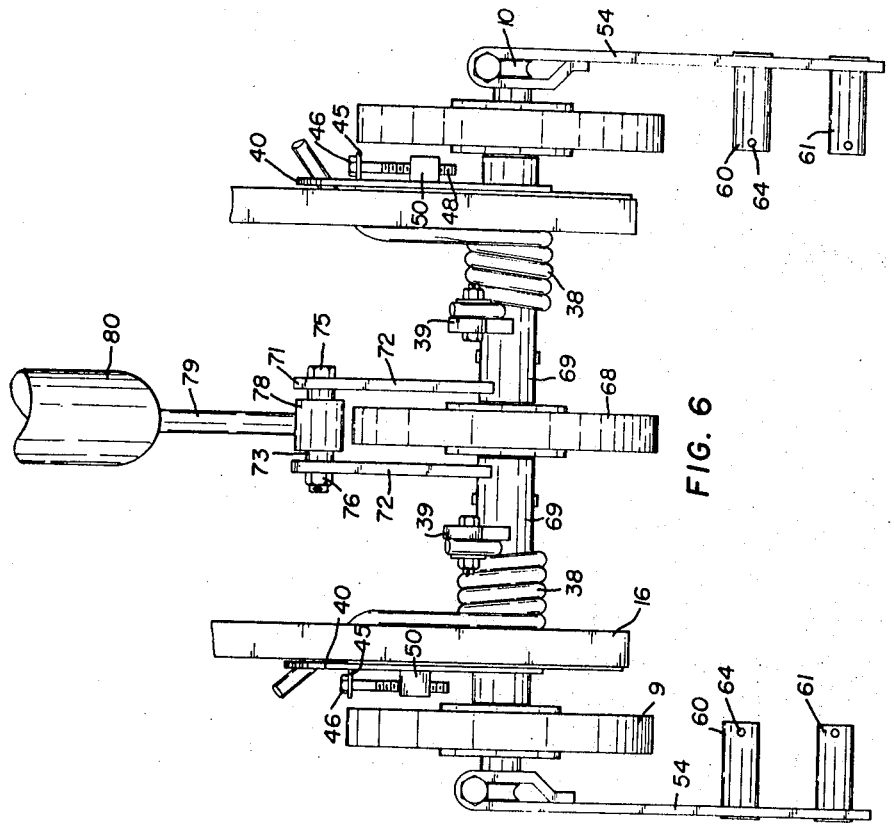
FIG. 6 is a plan view of the rear end of another form of the suspension system of FIG. 2.

In the embodiment of the invention shown in FIG. 6, an additional idler wheel 68 is provided on the centre of the axle 10, and accordingly the sleeve 35 is replaced by two sleeves 69 extending between the idler wheels 9 and the idler wheel 68. The inner ends of the sleeve 69 are interconnected by a generally U-shaped bracket 71, which includes arms 72 and a hollow shaft 73 secured to the arms by a bolt 75 and a nut 76. The shaft 73 performs as an axle for a sleeve 78 on the outer end of a piston rod 79 of a shock absorber 80.

It will be appreciated that the shock absorber 80 and the additional idler wheel 68 are optional features of the present invention. If desired, a shock absorber 80 could be connected to the sleeve 37 of the embodiment of FIG. 5 by a bracket 71.

OPERATION

In operation, the front end suspension, including the springs 35, performs in a conventional manner permitting vertical movement of the front end of the bogie frame 15 through a distance determined by the height of the frame 15 and the location of the shaft and sleeve 31 interconnecting the arms 28.

The rear end suspension system of the present invention permits resilient, vertical movement of the rear end of the frame 15 through a relatively large distance. When the rear end of the vehicle passes over a bump, the rear end of the track 8 and idler wheels 9 move upwardly. The vehicle frame 1 is permitted to move downwardly by virtue of the knee action of the linkage between the axle 10 and the shaft 11. The springs 38 cushions vertical movement of the frame 1, and, if the shock absorber 80 is used, it further cushions such vertical movement of the bogie frame 16 relative to the frame 1, and vice versa resulting in a smooth ride.

During upward movement of the idler wheels 9, the horizontal linkage arm 54 pivots about the axis of the axle 10 to move the vertical linkage arm 65, the shaft 11 and the rear end of the vehicle frame 1 downwardly. However, rapid vertical movement of the bogie frame 15 is prevented by the springs 38, which tend to maintain the rear end of the frame 16 in a fixed position relative to the vehicle frame 1, while permitting resilient movement of such rear end of the frame 16.

When the vehicle is being used by one person, i.e., a driver, the lower ends of the vertical linkage arms 65 are connected to the stub axles 61 on the horizontal linkage arms 54 and, when the vehicle is being used by two persons, the vertical arms 65 are connected to the bottom stub axles 60. The larger the load on the rear end of the vehicle frame 1, the greater the moment of force acting on the torsion springs 38 via arms 54, axle 10 and sleeve 37 or sleeves 69. By moving the load closer to the fulcrum (axle 10) of the levers defined by the arms 54, the turning moment acting on the springs 38 is reduced, i.e., with a larger load the length of the lever is reduced to keep the force acting on the springs more or less constant. When the arm 54, sleeve 37 or sleeves 69, springs 38 and axle 10 rotate about the longitudinal axis of the axle, the vehicle frame 1 is biased in the opposite direction by the springs 38. When the shock absorber 80 is used, it merely dampens the vertical movement of the rear end of the vehicle frame 1.

I claim:

1. A suspension system for an endless track vehicle of the type including a vehicle frame, an endless track mounted beneath said vehicle frame for driving the vehicle, and means for driving the endless track including a driven shaft supporting driven wheels in the front end of said endless track and an idler axis supporting idler wheels in the rear end of said track, said system comprising a bogie frame disposed within said endless track and having a front end resiliently connected to said vehicle frame for supporting the track, a plurality of track supporting rollers rotatably mounted on said bogie frame, linkage means resiliently connecting the rear end of said bogie frame to the vehicle frame, said linkage means including at least one linkage arm secured to the axle of said idler rollers and rotatably connected to said vehicle frame, and spring means interconnecting said idler axle and said bogie frame, whereby vertical movement of said bogie frame relative to said vehicle frame causes vertical movement of said linkage arm and rotation of said axle against the action of said spring means.

2. A suspension system according to claim 1, including a sleeve securely mounted on said axle, said spring means being torsion springs mounted on said sleeve and interconnecting the sleeve and said bogie frame.

3. A suspension system according to claim 1, wherein said bogie frame includes means for moving said idler axle longitudinally in said bogie frame, whereby the tension on said endless track can be adjusted.

4. A suspension system according to claim 1, wherein said bogie frame includes a pair of side frame members; shafts for rotatably supporting said rollers extending between and through said side frame members; and means in each side frame member for moving said idler axle longitudinally in said frame members to permit adjustment of the tension on said endless track.

5. A suspension system according to claim 1 wherein said linkage means includes a horizontal linkage arm and a vertical linkage arm, one end of said horizontal linkage arm secured to the axle of said idler rollers, the other end of said horizontal linkage arm secured to the lower end of said vertical linkage arm, the upper end of said vertical linkage arm rotatably connected to said vehicle frame.

6. A suspension system according to claim 5, wherein said horizontal linkage arm includes means for adjusting the position of the rotatable connection between the horizontal and vertical linkage arms relative to said other end of said horizontal linkage arm, whereby the moment of force acting on said idler axle can be varied.

* * * * *